(12) United States Patent
Makita (10) Patent No.: US 6,249,491 B1
(45) Date of Patent: Jun. 19, 2001

(54) MAGNETO-OPTICAL HEAD HAVING DUAL MAGNETIC FIELD GENERATORS

(75) Inventor: Akihiko Makita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/417,177

(22) Filed: Oct. 12, 1999

(30) Foreign Application Priority Data

Oct. 16, 1998 (JP) .................................................. 10-295467

(51) Int. Cl.$^7$ ...................................................... G11B 11/00
(52) U.S. Cl. .............................................................. 369/13
(58) Field of Search ............................... 369/13, 14, 110, 369/116; 360/114, 59, 46

(56) References Cited

U.S. PATENT DOCUMENTS

| | | | |
|---|---|---|---|
| 5,140,568 | * 8/1992 | Yoda | 369/13 |
| 5,313,444 | * 5/1994 | Ishii et al. | 369/13 |
| 5,367,508 | * 11/1994 | Haba | 369/13 |
| 5,444,678 | * 8/1995 | Ogata | 369/13 |
| 5,485,435 | * 1/1996 | Matsuda et al. | 369/13 |
| 5,500,839 | * 3/1996 | Miyake et al. | 369/13 |

FOREIGN PATENT DOCUMENTS

| | | |
|---|---|---|
| 6131738 | 5/1994 | (JP) . |
| 6215434 | 8/1994 | (JP) . |
| 7326086 | 12/1995 | (JP) . |

* cited by examiner

Primary Examiner—Tan Dinh
(74) Attorney, Agent, or Firm—Greer, Burns & Crain, Ltd.

(57) ABSTRACT

A magnetic head used in a magneto-optical disk apparatus is provided. The magnetic head includes a slider brought into facing relation to a disk member rotatable in a predetermined rotating direction. The slider includes a leading portion and a trailing portion which is spaced downstream from the leading portion in the above rotating direction. The magnetic head also includes a first magnetic field generator carried by the slider and a second magnetic field generator carried by the slider. The second magnetic field generator is arranged closer to the trailing portion of the slider than the first magnetic field generator is.

7 Claims, 6 Drawing Sheets

FIG.6

MAGNETO-OPTICAL HEAD HAVING DUAL MAGNETIC FIELD GENERATORS

BACKGROUND OF THE INVENTION

1. Field of the Invention

The present invention relates to a magnetic head used for writing and reading data in and from a magneto-optical disk by utilizing Magnetically-induced Super Resolution (MSR for short) method.

2. Description of the Related Art

The MSR method is one of the techniques used for enabling proper reading operation of adjacent record marks which, with a resolution determined by the diameter of the laser spot, may fail to be recognized as separate marks An magneto-optical disk to be read by this method may include a plurality of magnetic layers whose magnetic characteristics can be varied depending on temperature. In operation, the data stored in the disk (or record marks stored in a recording layer of the magneto-optical disk) will be read out from an area of the laser spot which has a particular temperature.

More specifically, according to the MSR method, a laser beam is emitted onto the magneto-optical disk being rotated, and the laser beam forms a bright spot on the disk. As a result, a particular area of the disk is heated up, thereby dividing the disk into a relatively high temperature region and a relatively low temperature region. (As can be easily understood, the dividing manner described here is just an example, and the disk may be divided into three or more regions based on difference in temperature.)

Typically, the relatively high temperature region becomes elliptic in configuration (as viewed from above) to extend downstream of the laser spot. On the other hand, the relatively low temperature region is situated around the relatively high temperature region.

When the two regions of different temperatures are thus provided, one of the magnetic layers of the magneto-optical disk (an intermediate magnetic layer for example) will have its magnetic characteristics altered at a portion corresponding to the relatively high temperature region of the disk (or to the relatively low temperature region, alternatively).

As a result, this particular magnetic layer, which has its magnetic properties partially altered, works as a mask for shielding some of the record marks in the laser spot. Then, the magnetic information of the non-shielded record marks is transferred to the regeneration layer of the disk and will be read out optically.

The MSR technique described above has several variations. Among them are RAD (Rear Aperture Detection) method, FAD (Front Aperture Detection) method, D-RAD (Double mask RAD) method and CAD (Center Aperture Detection) method. In the first three methods (RAD, FAD and D-RAD), use is made of a magnetic film with perpendicular magnetization for the regeneration layer of the disk, whereas the last method (CAD) utilizes a magnetic film with horizontal magnetization for the regeneration layer. In the magnetic film with horizontal magnetization, the direction of magnetization is horizontal at room temperature, but the direction may be turned to be perpendicular when the film is heated up to a temperature of 100 to 150° C.

According to the RAD method, the relatively low temperature region is masked, and data will be read out from the relatively high temperature region. On the other hand, by the FAD, data are to be read out from the relatively low temperature region, with the relatively high temperature region being masked. By D-RAD, both the relatively high and low temperature regions are masked, so that data will be read out from an intermediate temperature region. By the CAD, the relatively low temperature region will be masked.

Each of the RAD, the FAD and the D-RAD requires that the regeneration layer of the magneto-optical disk be magnetically initialized (alignment of magnetization) before the magnetic information is transferred from the recording layer to the regeneration layer. Thus, in order to employ any one of the above three methods for performing data-reading, it is necessary to provide both a regenerating magnetic field generator and an initializing magnetic field generator.

The regenerating magnetic field generator may be located at a position corresponding to the laser spot, while the initializing magnetic field generator may be located at a position spaced upstream from the laser spot. When the CAD method is utilized, an initializing magnetic field generator is not necessary because the magnetic film with horizontal magnetization is used for the regeneration layer. (As the temperature decreases, the direction of the magnetization of the magnetic film is changed from the perpendicular one to the horizontal one. This means that the initialization of the magnetic film is automatically performed with the fall of the temperature.) Actually, when the CAD method is used, no initializing magnetic field generator should be provided, so that the magnetic condition of the magnetic film can be prevented from being disturbed by an external magnetic field.

Turning now to a data-writing operation for the magneto-optical disk, a laser beam is emitted onto the disk while an external magnetic field having a predetermined direction is being applied to the recording layer. When the temperature of a portion of the recording layer is raised above the Curie temperature by the laser beam, the direction of the magnetization of that particular portion is reversed, which means that data are stored.

As described above, a disk apparatus capable of reading and writing data from and in a magneto-optical disk needs both an optical head for emitting a laser beam onto the disk and a magnetic head for generating magnetic fields to perform data-storage, data-reading and disk-initializing operations. Typically, the optical head is held in facing relation to the recording surface of the disk, while the magnetic head is arranged opposite to the optical head with respect to the magneto-optical disk.

In this connection, JP-A-7(1995)-326086 for example discloses, as shown in FIG. 5 of the document, a bias magnet (07) for generating a magnetic field to perform data-reading and data-writing, and an initializing magnet (09) carried by a slider (08*a*). The initializing magnet (09) is a permanent magnet.

With the disclosed arrangement, the bias magnet (07) and the initializing magnet (09) are separately supported by different supporting members. The problem of such an arrangement is that the supporting structure for the two magnets tends to be complicated, thereby making the assembly and/or maintenance of the supporting structure rather difficult. Further, since the initializing magnet (09) is a permanent magnet, the CAD method cannot be used for the disclosed apparatus.

JP-A-6(1994)-131738 discloses, as shown in FIG. 6 of the document, a magnet head device including a bias magnet (41) and a slider (37) carrying the bias magnet. The slider (37), however, is not provided with an initializing magnet. Thus, an initializing means may need to be separately prepared, which makes it difficult to reduce the size of the magnetic head device (and consequently, the size of the entire magneto-optical disk apparatus).

SUMMARY OF THE INVENTION

The present invention has been proposed under the above circumstances, and its objective is to overcome the problems described above.

According to the present invention, there is provided a magnetic head used in a magneto-optical disk apparatus comprising:

a slider brought into facing relation to a disk member rotatable in a predetermined rotating direction, the slider including a leading portion and a trailing portion which is spaced downstream from the leading portion in the predetermined rotating direction;

a first magnetic field generator carried by the slider; and a second magnetic field generator carried by the slider and arranged closer to the trailing portion of the slider than the first magnetic field generator is.

With such an arrangement, since the first and the second magnetic field generators are mounted on the single slider, the slider can be compact.

According to a preferred embodiment, each of the first and the second magnetic field generators may be an electromagnet. Specifically, the first magnetic field generator may comprise a first core member and a coil wound on the first core member, and the second magnetic field generator may comprise a second core member and another coil wound on the second core member.

Preferably, each of the first and the second core members may includes at least first and second leg portions. The coil may be provided on the first leg portion.

According to another preferred embodiment, at least one of the first and the second core members may include a third leg portion. In this case, the first leg portion may be arranged between the second leg portion and the third leg portion.

Preferably, the second leg portion of the first core member may be located away from a region extending between the first leg portion of the first core member and the first leg portion of the second core member.

Preferably, the second leg portion of the second core member may also be located away from the above-mentioned region.

Preferably, the slider may comprise an outer side surface arranged radially outward of the disk member. The first and the second magnetic field generators may be disposed adjacent to the outer side surface.

Preferably, each of the first and the second core members may include a connecting portion and at least first and second leg portions extending from the connecting portion. In this case, the connecting portion of the first core member may be arranged in parallel to the outer side surface of the slider, while the connecting portion of the second core member may be arranged in parallel to the trailing portion of the slider.

Preferably, the first magnetic field generator may be greater in inductance than the second magnetic field generator.

Other objects, features and advantages of the present invention will become clearer from the following detailed description given with reference to the accompanying drawings.

DETAILED DESCRIPTION OF THE PREFERRED EMBODIMENTS

The preferred embodiments of the present invention will be described below with reference to the accompanying drawings.

Figure 1:
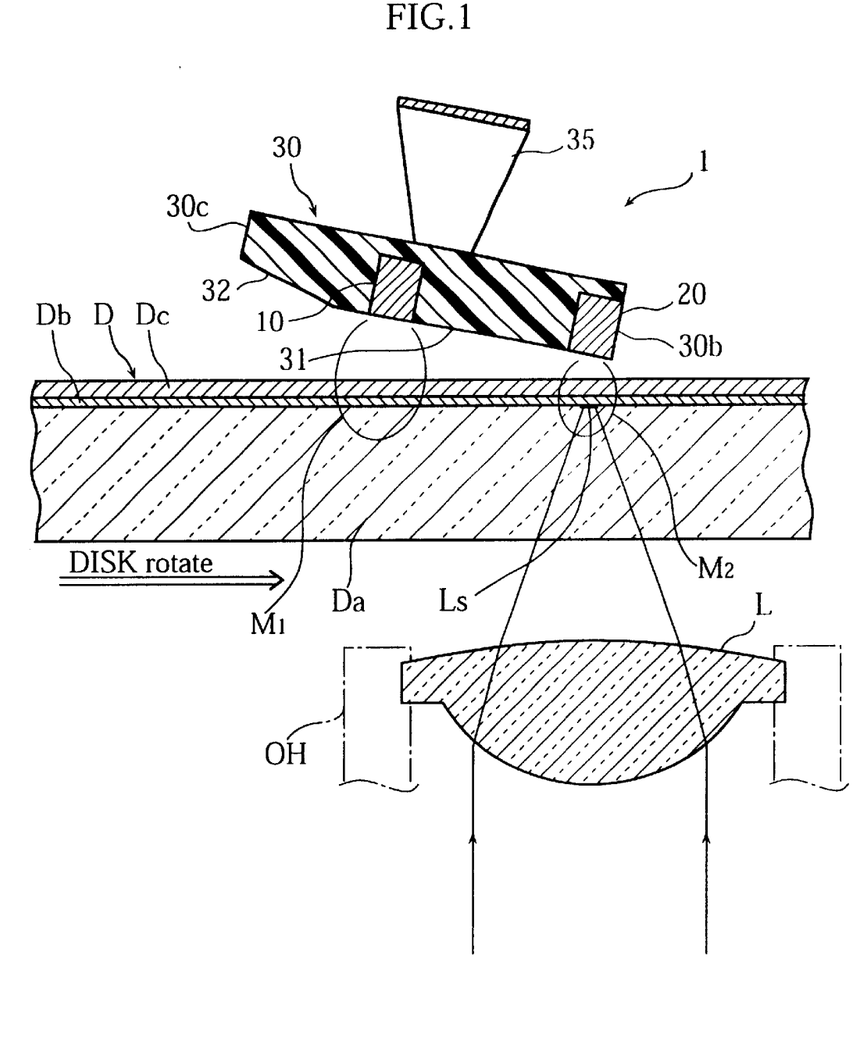
FIG. 1 is a sectional side view schematically showing the construction of a magneto-optical disk apparatus incorporating a magnetic head according to a first embodiment of the present invention.

Reference is first made to FIG. 1 which schematically illustrates a magneto-optical disk apparatus incorporating a magnetic head (generally indicated by reference numeral 1) according to a first embodiment of the present invention. In the figure, reference character D refers to a magneto-optical disk, reference character L to an objective lens of an optical head OH, and reference numeral 30 to a slider of the magnetic head 1 of the present invention.

The magneto-optical disk D includes a transparent disk substrate Da made of e.g. a resin material such as polycarbonate. On one side (the upper side, in FIG. 1) of the disk substrate Da is formed a magneto-optical layer Db for writing and reading of data. The magneto-optical layer Db is covered by a protection layer Dc. Typically, the magneto-optical layer layer Db is made up of more than one thin layer and its structure may differ depending on a data-storing and data-regenerating method to be used. In the illustrated embodiment, however, the magneto-optical layer layer Db is simply depicted as a single layer.

As shown in FIG. 1, the optical head OH is held in facing relation to the transparent disk substrate Da of the disk D, so that the objective lens L focuses laser light emitted from a light source (not shown) onto the magneto-optical layer Db through the disk substrate Da. In this manner, the focused light makes a beam spot Ls of a certain diameter on the layer Db. Though not illustrated, the optical head OH is provided with a suitable actuator for providing a focus servo function and a track servo function.

The slider 30 is arranged opposite to the optical head OH with respect to the disk D. As shown in FIG. 1, the slider 30 has a lower surface 31 to be brought into facing relation to the disk D.

Figure 2:
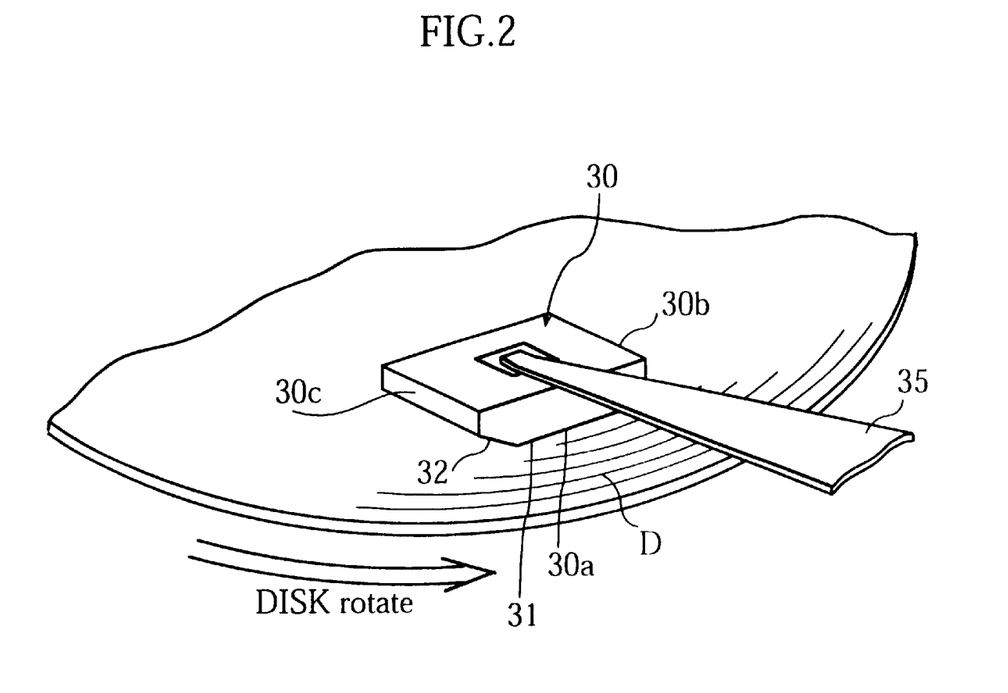
FIG. 2 is a perspective view showing the magnetic head of FIG. 1.
Figure 3:
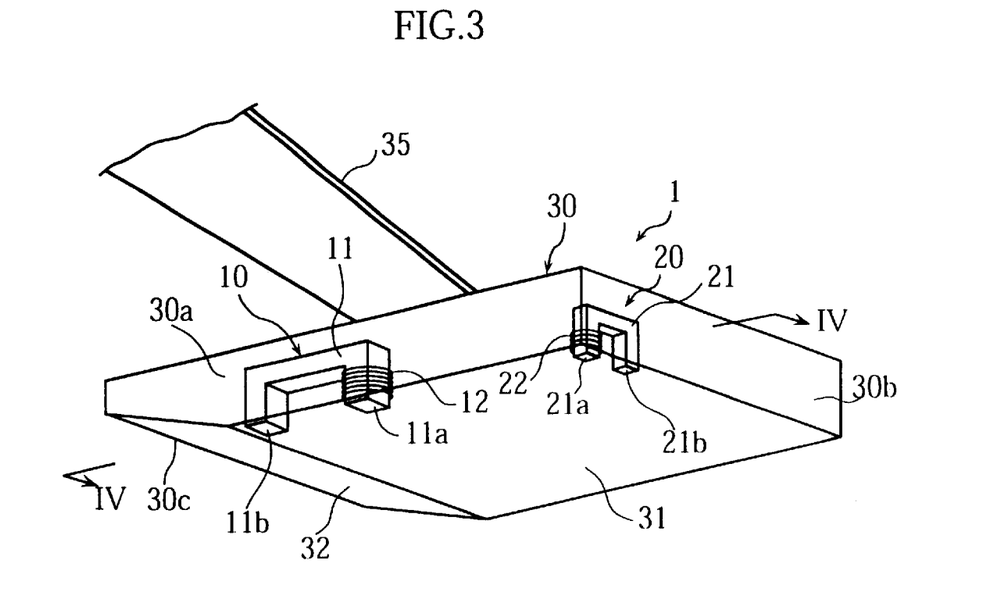
FIG. 3 is a perspective view showing the inside of the magnetic head of FIG. 1.

As shown in FIGS. 2 and 3, the slider 30 is carried by a suspension arm 35 which in turn is supported by a driving carriage (not shown). With such an arrangement, upon actuation of the non-illustrated carriage, the slider 30 can be moved radially inward or outward of the disk D, as required.

In the illustrated embodiment, the slider 30 has a rectangular configuration as viewed from above and has a suitable thickness. The slider 30 may be made of a resin material, in which a first magnetic field generating means 10 and a second magnetic field generating means 20 are embedded. Use is made of conduction wires for supplying the first and the second generating means 10, 20 with electrical power, though they are not illustrated.

As best shown in FIG. 1, the slider 30 is formed with a tapered portion 32 adjacent to its lower surface 31. The tapered portion 32 is also adjacent to a leading edge 30c of the slider 30. With such an arrangement, when the disk D is rotated in a predetermined direction indicated by the arrow, air adjacent to the upper surface of the disk D is dragged by the rotating disk D to be introduced between the upper surface of the disk D and the lower surface 31 of the slider 30 on the side of the leading edge 30c.

As a result, an air wedge is formed between the upper surface of the disk D and the lower surface 31 of the slider 30, whereby the lifting pressure of the air wedge causes the slider 30 to float over the disk D. The air introduced between the upper surface of the disk D and the lower surface 31 of the slider 30 will go out on the side of a trailing edge 30b of the slider 30 which is opposite to the leading edge 30c.

The first magnetic field generating means 10 is arranged closer to the leading edge 30c within the slider 30, while the second magnetic field generating means 20 is arranged adjacent to the trailing edge 30b within the slider 30. The first generating means 10 serves as a generator of an initializing magnetic field, whereas the second generating means 20 serves as a generator of a bias magnetic field for writing or reading data. Therefore, the second generating means 20 is to be disposed at a position corresponding to the beam spot Ls, while the first generating means 10 is to be disposed upstream of the disk rotating direction from the second generating means 20, as shown in FIG. 1. More accurately, the first generating means 10 is arranged at a position spaced upstream from the second generating means 20 along a track Tr (see FIG. 5) on which the beam spot Ls is formed. When operated, the first and the second generating means 10, 20 generate desired vertical magnetic fields in effective magnetic field regions M1 and M2, respectively.

According to the first embodiment of the present invention, the first magnetic field generating means 10 is provided by a combination of a first core member (or yoke) 11 and a first coil 12, while the second magnetic field generating means 20 is provided by a combination of a second core member (or yoke) 21 and a second coil 22. As shown in FIG. 3, these two yokes 11 and 21 have a C-shaped configuration and may be made of soft iron.

Specifically, the first yoke 11 includes a connecting intermediate portion and two parallel leg portions 11a, 11b extending at the right angle from the intermediate portion. When embedded in the slider 30, the connecting intermediate portion of the yoke 11 is arranged adjacent and in parallel to a radially outer side surface 30a of the slider 30, with the first leg portion 11a disposed closer to the trailing edge 30b than the second leg portion 11b is, as shown in FIGS. 3 and 5.

Similarly, the second yoke 21 includes a connecting intermediate portion and two parallel leg portions 21a, 21b extending at the right angle from the intermediate portion. When embedded in the slider 30, the connecting intermediate portion of the yoke 21 is arranged adjacent and in parallel to the trailing edge 30b of the slider 30, with the first leg portion 21a disposed closer to the radially outer side surface 30a than the second leg portion 21b is.

Figure 4:
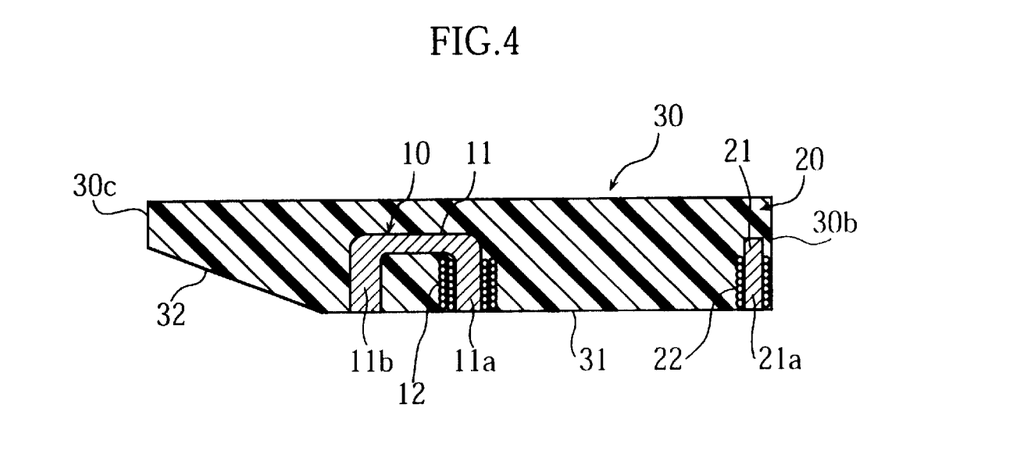
FIG. 4 is a sectional view taken along lines IV—IV in FIG. 3.

The first coil 12 is provided on the first leg portion 11a of the first yoke 11, while the second coil 22 is provided on the first leg portion 21a of the second yoke 21. Thus, regarding the first yoke 11, the strongest vertical magnetic field is generated in the vicinity of the first leg portion 11a, while regarding the second yoke 21, the strongest vertical magnetic field is generated in the vicinity of the first leg portion 21a. The first leg portions 11a, 21a and the second leg portions 11b, 21b of the first and the second yokes 11, 21 are exposed to the exterior, as can be seen from FIGS. 3–4 5.

Figure 5:
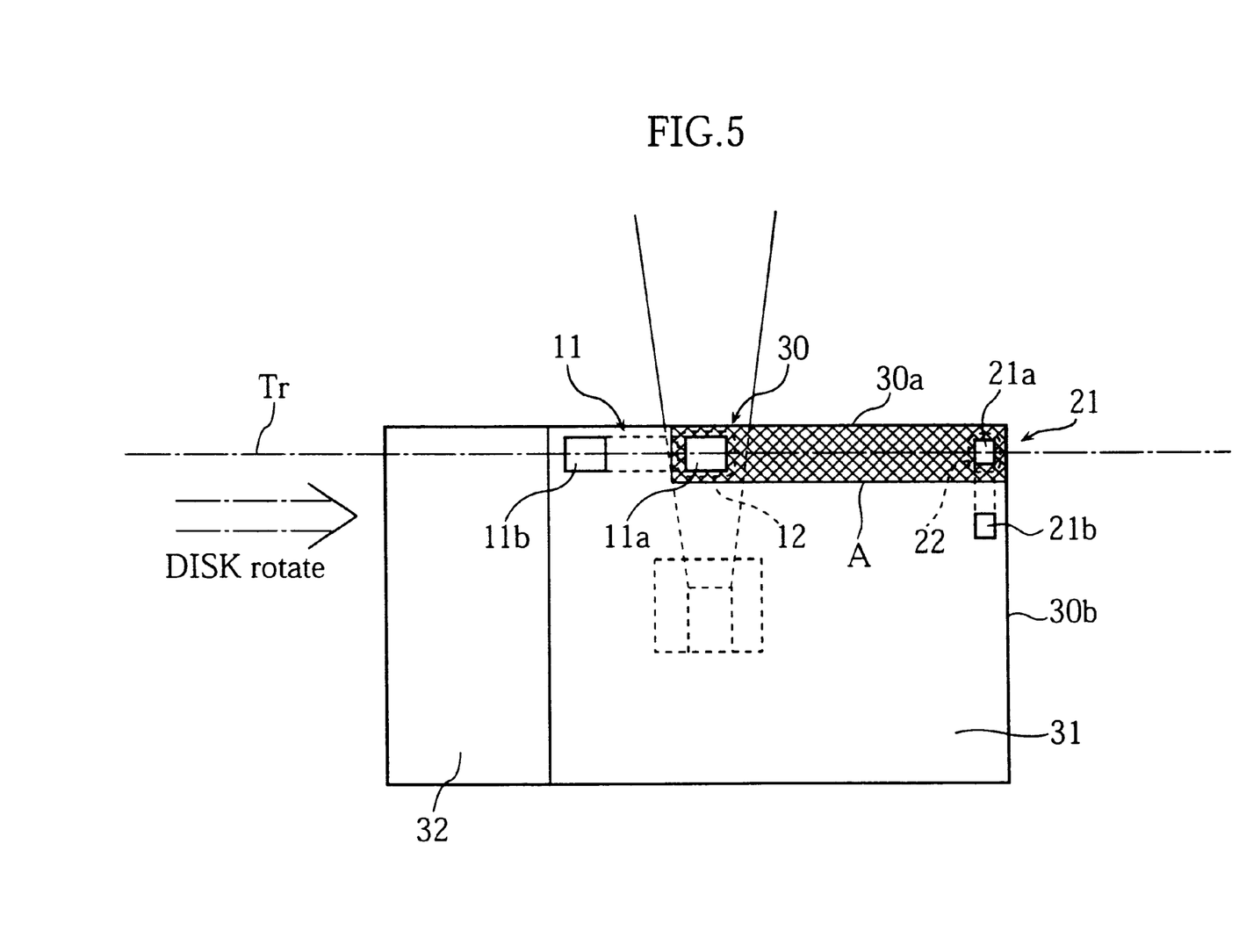
FIG. 5 is a bottom view showing the magnetic head of FIG. 1.

As shown in FIGS. 2 and 5, the posture of the slider 30 with respect to the disk D is determined so that the outer side surface 30a of the slider 30 extends in parallel to the disk rotating direction. (Here, the "disk rotating direction" should be considered locally so that the "direction" can be regarded as linearly extending.) Thus, as best shown in FIG. 5, the outer side surface 30a of the slider 30 is held in parallel to a recording track Tr of the disk D.

With the above arrangement, as shown in FIG. 5, the intermediate portion of the first yoke 11 is aligned with the recording track Tr, whereas the intermediate portion of the second yoke 21 is perpendicular to the same recording track Tr. It should be noted that the second leg portions 11b, 21b of the first and the second yokes 11, 21 are turned away from the cross-hatched rectangular region A connecting the first leg portions 11a, 21a of the first and the second yokes 11, 21. The technical significance of this arrangement will be described later.

As shown in FIGS. 3 and 5, the first yoke 11 of the first magnetic field generating means 10 is greater in size than the second yoke 21 of the second magnetic field generating means 20. Further, the number of turns of the first coil 12 is greater than that of the second coil 22, which follows that the inductance of the first magnetic field generating means 10 is greater than that of the second magnetic field generating means 20. The technical significance of this arrangement will also be described later.

The magnetic head 1 of the first embodiment will operate in the following manner. As previously described, the slider 30 is caused to float over the rotating disk D, as shown in FIG. 1. Since a fluid wedge is formed between the disk D and the slider 30, the slider 30 is inclined so that the leading edge 30c of the slider 30 is raised higher than the trailing edge 30b.

When it is necessary to use an initializing magnetic field for reading data from the disk D (such is needed by RAD method, FAD method, and D-RAD method), the first magnetic field generating means 10 is used as an initializing magnetic field generator. Specifically, the first magnetic field generating means 10 when energized generates an initializing magnetic field in the effective magnetic field region M1, with magnetic lines extending from the first leg portion 11a of the first yoke 11. The strength of the initializing magnetic field can be varied by adjusting the electric current supplied to the first coil 12.

As stated above, the leading edge 30c of the slider 30 is raised higher with respect to the disk D than the trailing edge 30b. Thus, the first magnetic field generating means 10 is spaced farther away from the disk D than the second magnetic field generating means 20 is. For compensating this, however, the number of turns of the first coil 12 is rendered greater than that of the second coil 22. Thus, the resulting effective magnetic field region Mi becomes appropriately large.

As opposed to the above case, when use is made of a CAD method for reading data from the disk D, the initializing magnetic field should not be generated for preventing the magnetic layer from being unduly magnetized before the regeneration of data (unnecessary magnetization of the magnetic layer would lead to the degeneration of signal quality). Thus, in this application, no electric current is to be supplied to the first magnetic field generating means 10.

Referring back to the instance where the first magnetic field generating means 10 is in use, an area of the disk D initialized by the first magnetic field generating means 10 is brought into facing relation to the second magnetic field generating means 20, as the disk D is rotated. Then, the data contained in the initialized area of the disk D are read out by the second magnetic field generating means 20.

In this connection, it should be noted that the effective magnetic field region M2 generated by the second magnetic field generating means 20 is relatively small, since the number of turns of the coil 22 is relatively low. However, in operation, the second magnetic field generating means 20, which is arranged adjacent to the trailing edge 30b, is brought closer to the disk D than the first generating means 21 is. Thus, the effective magnetic field region M2 can properly achieve its function, though it is relatively small in size.

As can be seen from FIG. 5, the area of the disk D initialized by the first magnetic field generating means 10 is moved along the rectangular cross-hatched region A (from left to right in the figure). In the illustrated embodiment, as previously described, the second leg portions 11b, 21b of the first and the second yokes 11, 21 are positioned away from the region A. With such an arrangement, it is possible to prevent the above-mentioned initialized area of the disk D from being adversely affected magnetically by the magnetic flux returning to (or going out of) the second leg portions 11b, 21b of the first and the second yokes 11, 21.

Further, in the illustrated embodiment, the first and the second magnetic field generating means 10, 20 are adjacent to the outer side surface 30a of the slider 30 (see FIG. 5). With such an arrangement, it is possible to perform the data-storing or data-reading operation even with respect to the radially outermost circumferential area of the disk D while the slider 30 is being caused to properly float over the disk D.

Still further, the first magnetic field generating means 10 is arranged in the slider 30 so that the first yoke 11 is to be held in parallel to the outer side surface 30a of the slider 30. Such an arrangement is advantageous in that the installing process of the first magnetic field generating means 10 into the slider 30 can be easily performed. This holds for the second field generating means 20, the second yoke 21 of which is to be held adjacent and in parallel to the trailing edge 30b of the slider 30.

In the illustrated embodiment, the inductance of the first magnetic field generating means 10 is greater than that of the second magnetic field generating means 20. In other words, the inductance of the second magnetic field generating means 20 is relatively small. In such a situation, the inversion of the magnetic field by the second magnetic field generating means 20 can be performed rapidly. This feature is advantageous when the second magnetic field generating means 20 is used as a bias magnetic field generator for datarecording based on magnetic field modulation, since the rapid inversion of the magnetic field leads to the increase in density of data to be stored in a magneto-optical disk.

Figure 6:
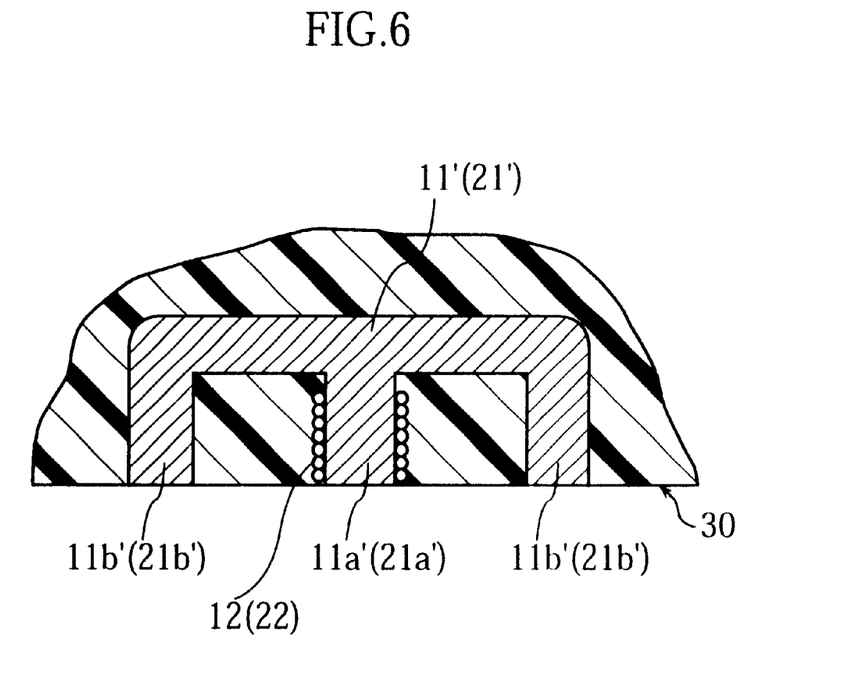
FIG. 6 is a sectional side view showing principal parts of a magnetic head according to a second embodiment of the present invention.

Reference is now made to FIG. 6 illustrating principal portions of a magnetic head according to a second embodiment of the present invention. The illustrated magnetic head includes a slider 30 into which two yokes 11', 21' (only one is shown in the figure) are embedded, as in the previous embodiment. In the second embodiment, the yoke 11' (and the other yoke 21' as well) has an E-shaped configuration. Specifically, the yoke 11' includes a connecting intermediate portion and three parallel leg portions extending at the right angle from the intermediate portion. The three leg portions are a central leg portion 11a' and side leg portions 11b'. A coil 12 is wound on the central leg portion 11a' (a coil 22 is wound on the central leg portion 21a' of the non-illustrated yoke 21'). In this embodiment again, the side leg portions 11b' (and the side leg portions 21b' of the non-illustrated yoke 21') are caused to be located away from a region connecting the two central leg portions 11a' and 21a'.

Figure 7:
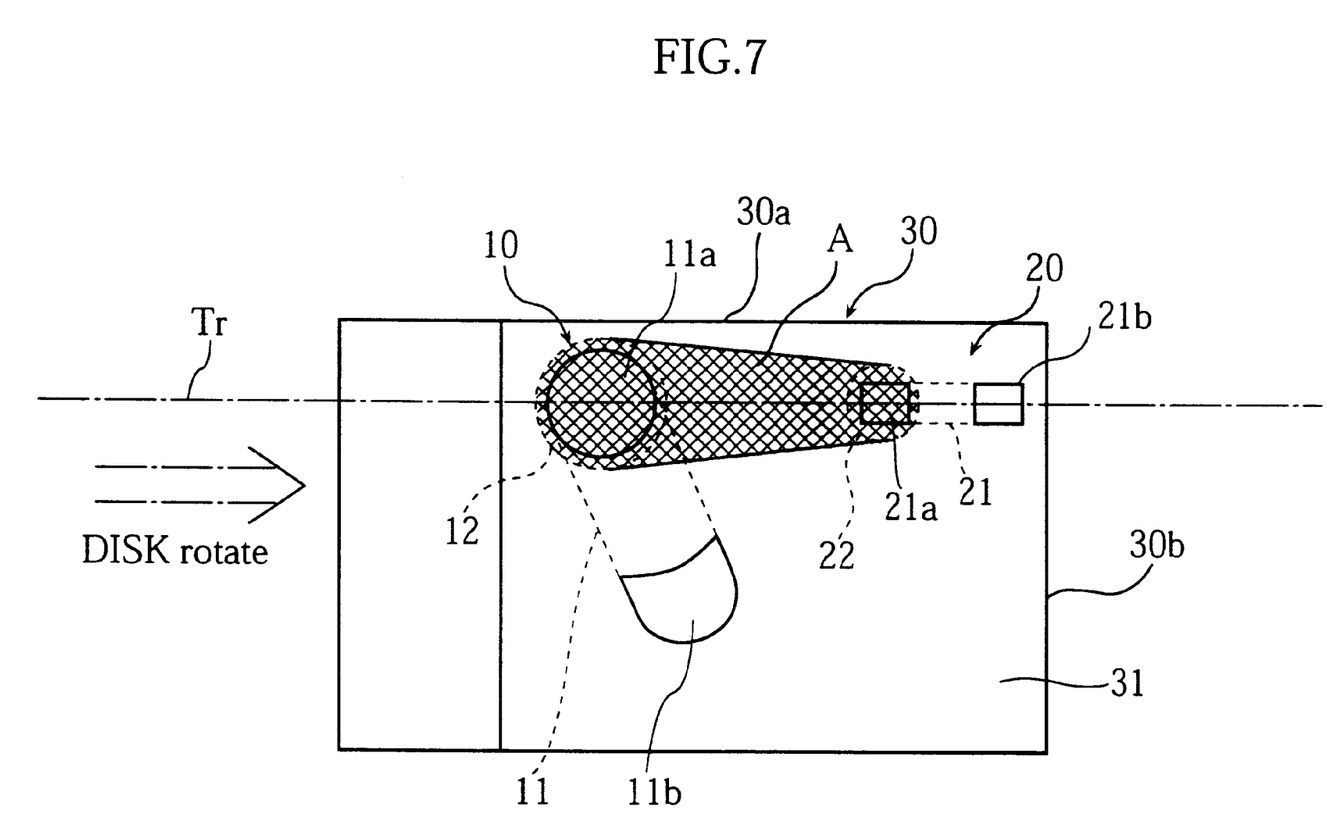
FIG. 7 is a bottom view showing a magnetic head according to a third embodiment of the present invention.

FIG. 7 illustrates principal portions of a magnetic head according to a third embodiment of the present invention. In this embodiment, a C-shaped first yoke 11 (for a first magnetic field generating means 10) and another C-shaped second yoke 21 (for a second magnetic field generating means 20) are embedded in a slider 30. Though not illustrated, a coil is wound on a first leg portion 11a of the first yoke 11, while another coil is wound on a first leg portion 21a of the second yoke 21.

As illustrated, the first leg portion 11a of the first yoke 11 is positioned adjacent to an outer side surface 30a of the slider 30, whereas the other (or second) leg portion 11b, on which no coil is wound, is offset inwardly (or away) from the outer side surface 30a. The first leg portion 11a of the first yoke 11 is located on a track Tr of the disk D.

Turning now to the second yoke 21, its first leg portion 21a and the other (or second) leg portion 21b (with no coil wound) are both located on the track Tr. Thus, in this embodiment, the first leg portion 11a of the first yoke 11 as well as the first and second leg portions 21a, 21b of the second yoke 21 are arranged on the same track Tr. As shown in FIG. 7, the second leg portions 21b of the second yoke 21 is closer to the trailing edge 30b of the slider 30 than the first leg portion 21a.

In the third embodiment again, the second leg portions 11b, 21b (carrying no coil) of the first and the second yokes 11, 21 are not contained in the cross-hatched area A extending between the first leg portions 11a, 21a of the two yokes. Thus, it is possible to prevent a properly initialized area of the disk D from being adversely affected by the magnetic flux returning to (or going out from) the second leg portions 11b and 21b.

The present invention is not limited to the embodiments described above. The slider, for instance, may not necessarily have a rectangular configuration. The lower surface of the slider may be rendered cylindrical or spherical other than tapered. Further, the slider may be a sliding type other than a floating type. Furthermore, the yoke and the coil used for providing magnetic field generating means may be varied in arrangements.

What is claimed is:

1. A magnetic head used in a magneto-optical disk apparatus comprising:

a slider brought into facing relation to a disk member rotatable in a predetermined rotating direction, the slider including a leading edge and a trailing edge which is spaced downstream from the leading edge in the predetermined rotating direction;

a first magnetic field generator carried by the slider, the first magnetic field generator including a first core member and a first coil, the first core member including a first leg and a second leg, the first coil being wound on the first leg of the first core member; and a second magnetic field generator carried by the slider and arranged downstream from the first magnetic field generator in the predetermined rotating direction, the second magnetic field generator including a second core member and a second coil, the second core member including a first leg and a second leg, the second coil being wound on the first leg of the second core member;

wherein the second leg of the first core member is located away from a region extending between the first leg of the first core member and the first leg of the second core member.

2. The magnetic head according to claim 1, wherein at least one of the first and the second core members includes a third leg, the first leg portion being arranged between the second leg and the third leg of said at least one core member.

3. The magnetic head according to claim 1, wherein the second leg of the second core member is located away from said region.

4. The magnetic head according to claim 1, wherein the slider comprises an outer side surface arranged radially outward of the disk member, the first and the second magnetic field generators being disposed adjacent to the outer side surface.

5. The magnetic head according to claim 4, wherein each of the first and the second core members includes a connecting portion from which the first leg and the second leg of each said core member extends, the connecting portion of the first core member being arranged in parallel to the outer side surface of the slider, the connecting portion of the second core member being arranged in parallel to the trailing edge of the slider.

6. The magnetic head according to claim 1, wherein the first magnetic field generator is greater in inductance than the second magnetic field generator.

7. A magnetic head used in a magneto-optical disk apparatus comprising:

a slider brought into facing relation to a disk member rotatable in a predetermined rotating direction, the slider including a leading edge, a trailing edge positioned downstream from the leading edge in the predetermined rotating direction, and a radially outer side surface extending between the leading edge and the trailing edge;

a first magnetic field generator carried by the slider, the first magnetic field generator including a first core and a first coil, the first core including a connecting portion extending in parallel to the outer side surface of the slider adjacent thereto, a first leg located at a first end of the connecting portion, and a second leg located at a second end of the connecting portion closer to the leading edge than the first leg, the first coil being wound only on the first leg of the first core; and a second magnetic field generator carried by the slider and arranged downstream from the first magnetic field generator in the predetermined rotating direction, the second magnetic field generator including a second core and a second coil, the second core including a connecting portion extending in parallel to the trailing edge of the slider adjacent to the outer side surface of the slider, a first leg located at a first end of the connecting portion of the second core adjacent to the outer side surface of the slider, and a second leg located at a second end of the connecting portion of the second core located farther from the outer side surface of the slider than the first leg of the second core, the second coil being wound only on the first leg of the second core.

* * * * *